US012671172B2

(12) United States Patent
Le et al.

(10) Patent No.: US 12,671,172 B2
(45) Date of Patent: Jun. 30, 2026

(54) VEHICLE MOUNTED ANTENNA AND ANTENNA-MOUNTED VEHICLE

(71) Applicant: TOYOTA JIDOSHA KABUSHIKI KAISHA, Aichi-ken (JP)

(72) Inventors: Dinh thanh Le, Toyota (JP); Hiroshi Yoshimoto, Toyota (JP); Masahiko Uchida, Toyota (JP); Sumie Kurita, Aichi-gun (JP); Yuya Osamura, Toyoake (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 66 days.

(21) Appl. No.: 18/731,349

(22) Filed: Jun. 3, 2024

(65) Prior Publication Data

US 2024/0413515 A1 Dec. 12, 2024

(30) Foreign Application Priority Data

Jun. 6, 2023 (JP) ................................. 2023-093233

(51) Int. Cl.

| | |
|---|---|
| ***H01Q 1/32*** | (2006.01) |
| ***H01Q 1/12*** | (2006.01) |
| ***H01Q 5/371*** | (2015.01) |
| ***H01Q 9/16*** | (2006.01) |

(52) U.S. Cl.

CPC ......... *H01Q 1/3291* (2013.01); *H01Q 1/1271* (2013.01); *H01Q 5/371* (2015.01); *H01Q 9/16* (2013.01)

(58) Field of Classification Search

CPC .... H01Q 1/1271; H01Q 1/3291; H01Q 5/371; H01Q 9/16

See application file for complete search history.

(56) References Cited

U.S. PATENT DOCUMENTS

2007/0001915 A1 1/2007 Kono et al.

FOREIGN PATENT DOCUMENTS

| | | | | | |
|---|---|---|---|---|---|
| JP | 2004-088198 | A | | 3/2004 | |
| JP | 2004179790 | A | * | 6/2004 | ........... H01Q 1/3275 |
| JP | 2007-013847 | A | | 1/2007 | |
| JP | 2015100011 | A | * | 5/2015 | |

OTHER PUBLICATIONS

English translation of JP2004179790A (Year: 2004).*
English translation of JP2015100011A (Year: 2015).*

* cited by examiner

*Primary Examiner* — Amal Patel
(74) *Attorney, Agent, or Firm* — HAUPTMAN HAM, LLP

(57) ABSTRACT

The vehicle-mounted antenna includes a power supply pin disposed upright on the body, a first radiation element extending from the power supply pin in a horizontal plane rearward of the vehicle, and a second radiation element extending from the power supply pin in a horizontal plane forward of the vehicle. The first tip portion of the first radiation element is fixed to the body via a first insulating member. The second radiation element is longer than the first radiation element and comprises a second tip portion and an intermediate portion. The second tip portion is connected to the body. The intermediate portion is located between the power supply pin and the second tip portion and is fixed to the body via the second insulating member.

9 Claims, 7 Drawing Sheets

DETAIL B

CURRENT DISTRIBUTION DIAGRAM
IN THE LOW FREQUEBCY REGION G1

CURRENT DISTRIBUTION DIAGRAM
IN THE HIGH FREQUEBCY REGION G2

VEHICLE MOUNTED ANTENNA AND ANTENNA-MOUNTED VEHICLE

CROSS REFERENCE TO RELATED APPLICATION

This application claims priority to Japanese Patent Application No. 2023-093233 filed on Jun. 6, 2023, which is incorporated herein by reference in its entirety including the specification, claims, drawings, and abstract.

TECHNICAL FIELD

The present disclosure relates to a structure of vehicle-mounted antenna attached to a body of a vehicle and a structure of an antenna mounted vehicle.

BACKGROUND

Various wideband vehicle-mounted antennas have been proposed. For example, JP2007-13847A discloses a vehicle-mounted in which a loop antenna and a monopole antenna are integrated. In the loop antenna, the element length is formed by multiplying the wavelength of the radio wave in the UHF band by about "½". The monopole antenna has an element length obtained by multiplying the wavelength of the radio wave in the VHF band by about "¼". A loop antenna and a monopole antenna are fed from a common feeding point, In addition, JP2004-88198A discloses a wide-band antenna using a feed element having a diameter of 0.01 wavelength or more and a short-circuit conductor having a diameter of 0.01 wavelength or more.

SUMMARY

In recent years, there is a demand for mounting a digital television (DTV) on a vehicle. In this case, an antenna that receives a frequency of a wide band of the DTV is mounted on the vehicle. In order to receive a wide band of frequencies, a method of attaching a plurality of antennas to a window glass of a vehicle may be used, as disclosed in JP2007-13847A. In this case, there is a problem that the antenna is seen by the passenger of the vehicle, which is not preferable in terms of aesthetics.

Accordingly, it is an object of the present disclosure to provide a vehicle-mounted antenna that can be disposed so as not to be visible to a passenger of the vehicle and that can receive a wide-band radio wave.

The vehicle-mounted antenna of the present disclosure is attached to a body of a vehicle. The vehicle-mounted antenna of the present disclosure includes a power supply pin disposed in an upright position on the body, a first radiation element extending from the power supply pin along a first direction in a horizontal plane, and a second radiation element extending from the power supply pin along a second direction opposite to the first direction in the horizontal plane. The first tip portion of the first radiation element is fixed to the body via a first insulating member. The second radiation element is longer than the first radiation element and comprises a second tip portion and an intermediate portion. The second tip portion connected to the body. The intermediate portion located between the power supply pin and the second tip portion, and being fixed to the body via a second insulating member.

Thus, since the second radiation element receives a radio wave having a higher frequency than the frequency received by the first radiation element and adjusts the input impedance of the vehicle-mounted antenna, impedance matching can be achieved in a wide band. Therefore, the vehicle-mounted antenna of the present disclosure can obtain a high gain in a wide band. Further, according to the vehicle-mounted antenna of the present disclosure, since the first radiation element and the second radiation element are respectively fixed to the body via the insulating member, mutual coupling is generated between the body and the first radiation element and between the body and the second radiation element, and a wide-band radio wave can be received. Further, the vehicle-mounted antenna of the present disclosure is compact in configuration and can be attached to the body so as not to be seen by the passenger of the vehicle.

In the vehicle-mounted antenna of the present disclosure, the second radiation element may comprise a proximal portion close to the power supply pin and a distal portion distant from the power supply pin, the distal portion being greater in thickness than the proximal portion, and the intermediate portion may be a region located on a distal portion side of the proximal portion.

Thereby, the input impedance of the vehicle-mounted antenna is adjusted, and impedance matching in a wide band can be achieved. Therefore, the gain can be increased in a wide band.

In the vehicle-mounted antenna of the present disclosure, the first radiation element comprises an end segment extending downwardly from the first tip portion, and the end segment may be fixed to the body together with the first tip portion via the first insulating member.

Thus, the input impedance of the vehicle-mounted antenna in the low frequency region received by the first radiation element is adjusted, and impedance matching in the low frequency region can be achieved. Therefore, the gain in the low frequency region can be increased.

An antenna-mounted vehicle of the present disclosure comprising a body and an antenna, wherein the body comprises a window opening and a window glass arranged in the window opening. The window glass is provided with an opaque masking region at a peripheral portion of the window glass. The antenna is attached to the body so as to overlap with the masking region in a thickness direction of the window glass.

Thereby, the vehicle-mounted antenna can be prevented from touching the eyes of the passenger of the vehicle, and the aesthetics of the vehicle can be improved.

In the antenna-mounted vehicle according to the present disclosure, the vehicle-mounted antenna may comprises a power supply pin disposed in an upright position on an upper edge or a lower edge of the window opening, a first radiation element extending from the power supply pin along a first direction in a horizontal plane, and a second radiation element extending from the power supply pin along a second direction opposite to the first direction in the horizontal plane. The first tip portion of the first radiation element may be fixed to the upper edge or the lower edge of the window opening via a first insulating member. The second radiation element is longer than the first radiation element, and comprises a second tip portion and an intermediate portion. The second tip portion may be connected to a vertical edge of the window opening. The intermediate portion may be located between the power supply pin and the second tip portion, and being fixed to the upper edge or the lower edge of the window opening via a second insulating member. The power supply pin, the first radiation element, and the second radiation element are disposed so as to overlap the masking region in a thickness direction of the window glass.

Thereby, impedance matching can be achieved in a wide band with a compact configuration with a low height, and an antenna with a high gain can be obtained.

The vehicle-mounted antenna of the present disclosure can be disposed so as not to be seen by the passenger of the vehicle with a compact configuration with a low height, and can receive a wide-band radio wave.

DESCRIPTION OF EMBODIMENTS

Figure 1:
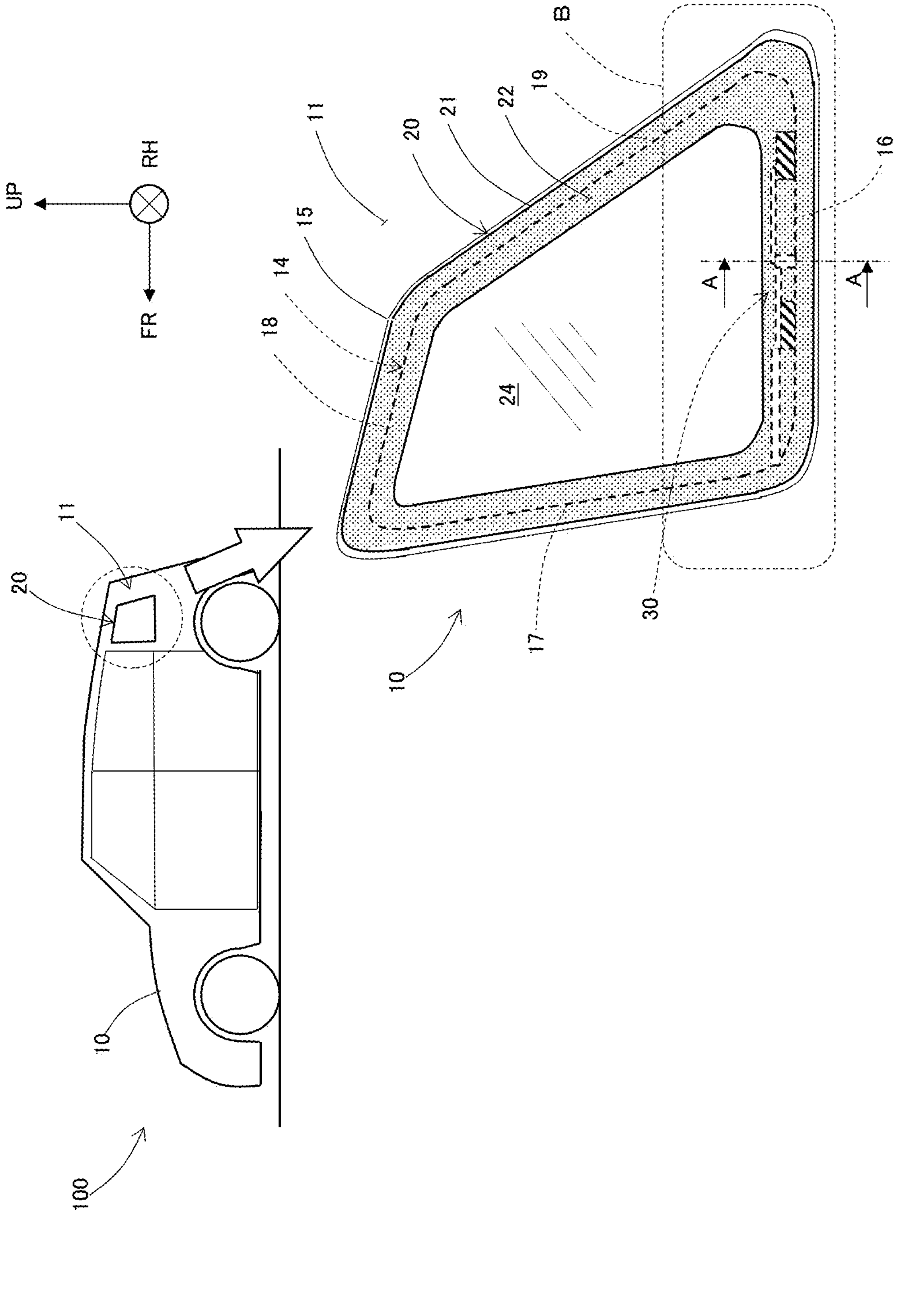
FIG. 1 is an elevation view showing an antenna-mounted vehicle and a rear quarter panel according to an embodiment.

Hereinafter, a configuration of an antenna-mounted vehicle 100 according to an embodiment and a vehicle-mounted antenna 30 attached to the antenna-mounted vehicle 100 will be described with reference to the drawings. In the following description, the antenna-mounted vehicle 100 is referred to as a vehicle 100. Arrows FR, UP, and RH shown in the drawings indicate the front side, the upper side, and the right side of the vehicle 100, respectively. The opposite directions of the arrows FR, UP, and RH indicate the rear side, the lower side, and the left side. Hereinafter, in the case of simply using the front-rear direction, the left-right direction, and the up-down direction, unless otherwise specified, the front-rear direction, the left-right direction, and the up-down direction of the vehicle 100 are indicated.

As shown in FIG. 1, a vehicle 100 includes a body 10 and a vehicle-mounted antenna 30 attached to the body 10.

The body 10 includes a rear quarter panel 11 behind the rear door. A rear quarter window 20 is provided in the rear quarter panel 11. The rear quarter window 20 includes a window opening 14 provided in the rear quarter panel 11, and a rear quarter glass 21 attached to the window opening 14. The rear quarter glass 21 is a window glass described in the claims.

Figure 2:
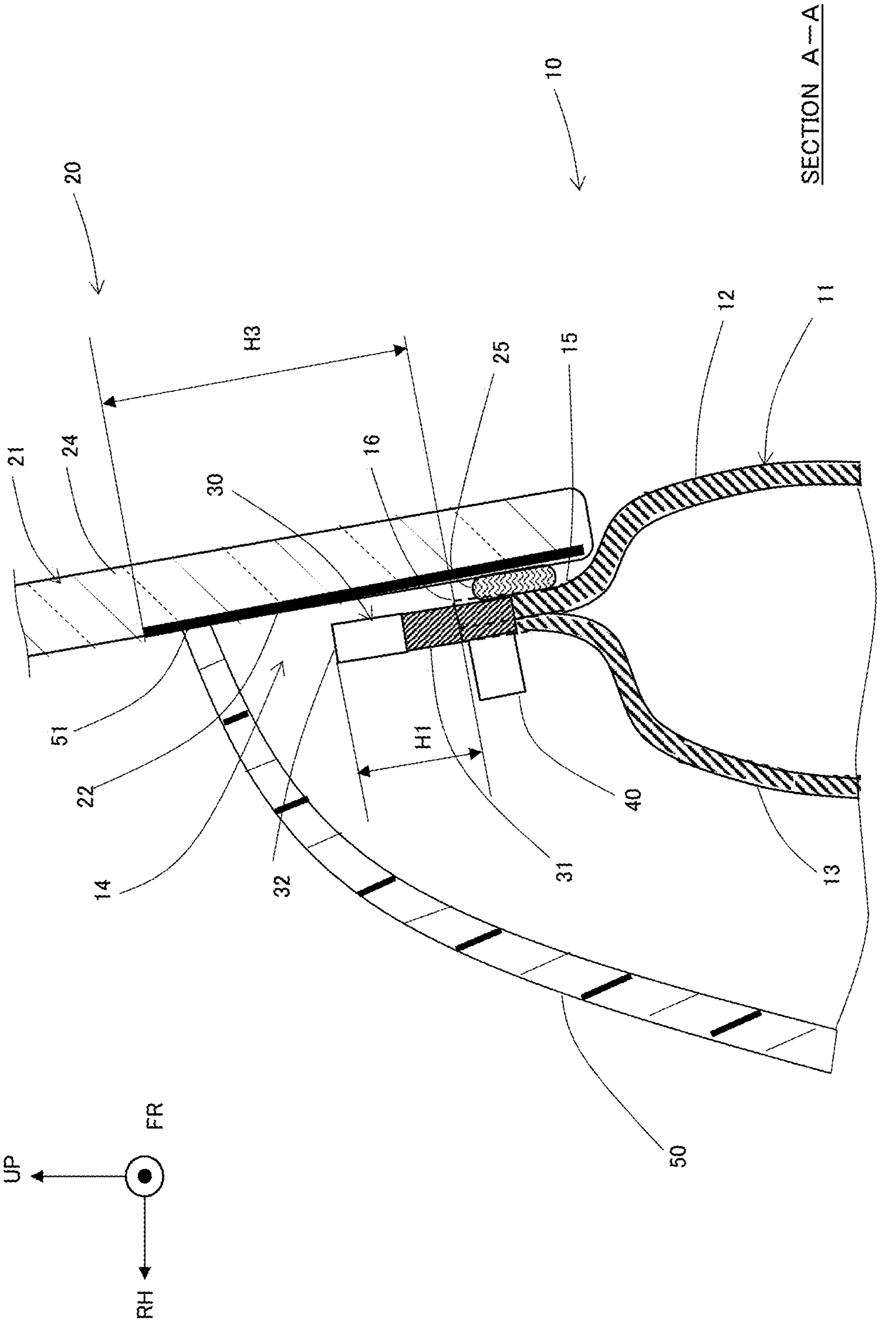
FIG. 2 is a cross-sectional view taken along the line A-A shown in FIG. 1, and is an elevation view showing a cross section of a rear quarter panel and a vehicle-mounted antenna.

As shown in FIG. 2, the rear quarter panel 11 includes an outer panel 12 and an inner panel 13. A step portion 15 is provided on an outer peripheral portion of the window opening 14 of the outer panel 12. The step portion 15 is a portion of the outer panel 12 recessed from the vehicle outer side surface toward the vehicle inner side. The lower side 16, the upper side 18, the front vertical side 17, and the rear vertical side 19 of the step portion 15 define a window opening 14. A vehicle-mounted antenna 30 is attached to the lower side 16. The configuration of the vehicle-mounted antenna 30 will be described later with reference to FIG. 3.

A rear quarter glass 21 is attached to the vehicle outer side surface of the step portion 15 by an adhesive 25. As shown in FIG. 1, the rear quarter glass 21 includes a central transparent region 24 and a peripheral masking region 22. The masking region 22 is colored, for example, in black, and is opaque. When the rear quarter glass 21 is attached to the step portion 15, the lower portion of the masking region 22 overlaps the vehicle-mounted antenna 30 in the thickness direction of the rear quarter glass 21. Thereby, the vehicle-mounted antenna 30 is not seen from the outside. An interior panel 50 is attached to a vehicle interior side of the rear quarter panel 11. The interior panel 50 has a upper end portion 51 in contact with the masking region 22 on the inner surface of the rear quarter glass 21, and covers the vehicle-mounted antenna 30 from the inside of the vehicle 100. Thereby, the vehicle-mounted antenna 30 is configured so as not to be seen from the vehicle interior. Thus, the vehicle-mounted antenna 30 does not touch the eyes of the passenger of the vehicle 100, and the aesthetics of the vehicle 100 can be improved.

Figure 3:
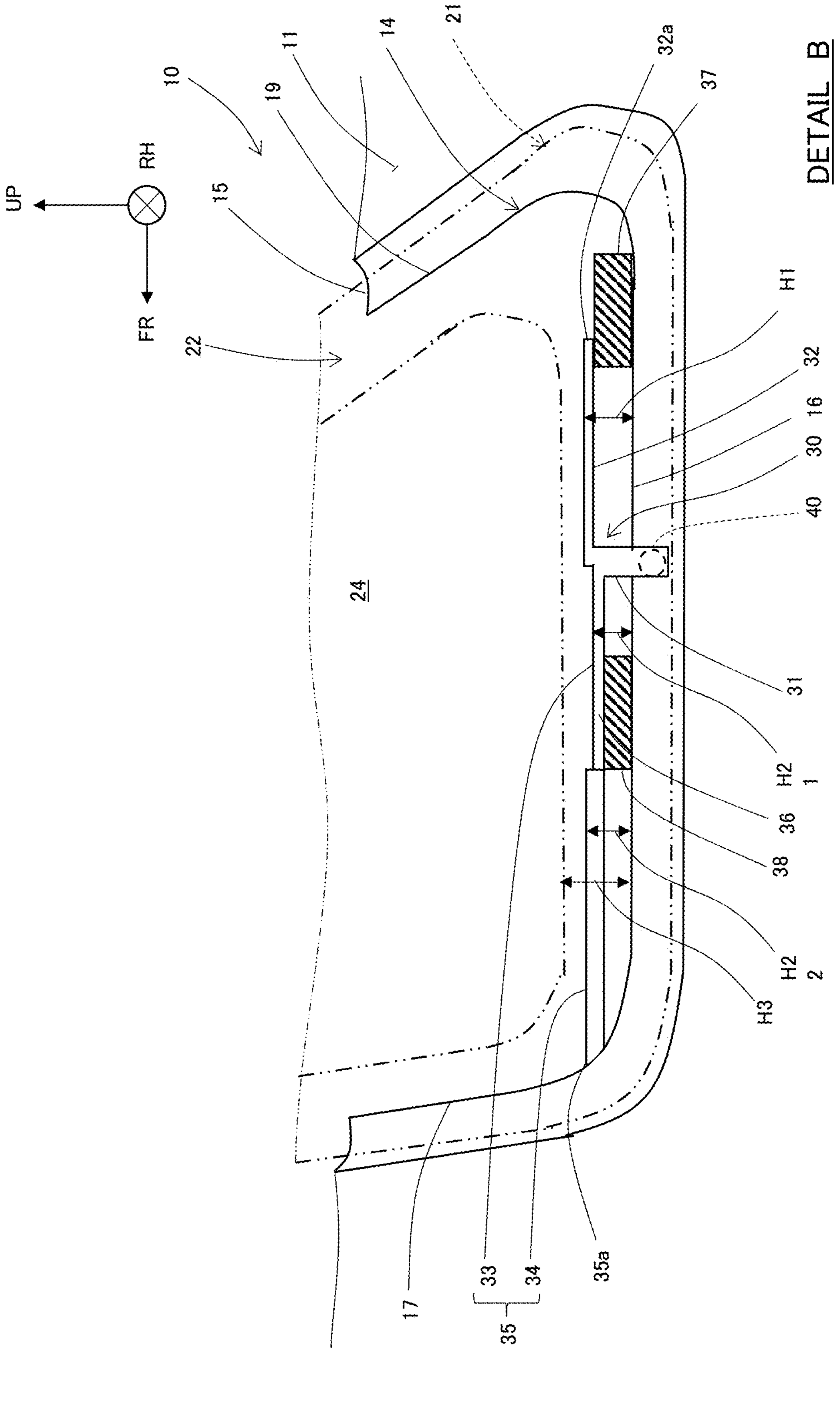
FIG. 3 is an elevation view showing a detailed state of a portion B shown in FIG. 1, in which a rear quarter glass is detached.

Next, the vehicle-mounted antenna 30 will be described. As shown in FIG. 3, the vehicle-mounted antenna 30 is a T-type antenna including a power supply pin 31, a first radiation element 32, a second radiation element 35, a first insulating member 37, and a second insulating member 38.

The power supply pin 31 is a metal plate-like member arranged to stand on the lower side 16 of the window opening 14. The power supply pin 31 extends from the lower side 16 toward the vehicle upward direction. A connector 40 is attached to a lower end of the power supply pin 31. A cable for supplying power to the first radiation element 32 and the second radiation element 35 is connected to the connector 40.

The first radiation element 32 is a metal elongated strip-shaped plate member extending from an upper portion of the power supply pin 31 toward the rear of the vehicle in a horizontal plane so as to receive a horizontally polarized DTV radio wave. The height in the vehicle vertical direction from the lower side 16 to the upper end surface of the first radiation element 32 is a height H1. Here, the rearward direction of the vehicle is the first direction described in the claims. A first tip portion 32*a* of the first radiation element 32 rearward of the vehicle is fixed to the lower side 16 via a first insulating member 37. The first insulating member 37 is made of resin or the like.

The second radiation element 35 is a metal elongated strip-shaped plate member longer than the first radiation element 32. The second radiation element 35 extends from the upper portion of the power supply pin 31 toward the front of the vehicle in the horizontal plane so as to receive the electric wave of the DTV of the horizontal polarization. Here, the forward direction of the vehicle is a direction opposite to the rearward direction of the vehicle and is the second direction described in the claims. The second tip portion 35*a* of the second radiation element 35 in front of the vehicle is connected to the front vertical side 17 of the window opening 14. The second radiation element 35 includes a proximal portion 33 near the power supply pin 31 and a distal portion 34 far from the power supply pin 31. The thickness of the distal portion 34 is greater than the thickness of the proximal portion 33. The input impedance of the vehicle-mounted antenna 30 is adjusted by the thickness of the distal portion 34 and the height H22. For this reason, the thickness of the distal portion 34 and the height H22 are adjusted such that impedance matching in a wide band can be achieved.

The intermediate portion 36 between the power supply pin 31 and the second tip portion 35*a* is fixed to the lower side 16 via the second insulating member 38. As shown in FIG. 3, the intermediate portion 36 is a distal portion of the proximal portion 33. The height in the vehicle vertical direction from the lower side 16 to the upper end surface of the proximal portion 33 is a height H21. The height from the lower side 16 to the upper end surface of the distal portion 34 is a height H22.

As shown in FIG. 3, the height from the lower side 16 to the upper end of the lower portion of the masking region 22 when the rear quarter glass 21 is attached to the step portion 15 is a height H3. The height H1 from the lower side 16 to the upper end of the first radiation element 32, the height H21 from the lower side 16 to the upper end of the proximal portion 33, and the height H22 from the lower side 16 to the upper end of the distal portion 34 are all lower than the height H3. Accordingly, as described above, when the rear quarter glass 21 is attached to the step portion 15, the power supply pin 31, the first radiation element 32, and the second radiation element 35 overlap the lower portion of the masking region 22 in the thickness direction of the rear quarter glass 21. Thereby, the vehicle-mounted antenna 30 is not seen from the outside.

Figure 4:
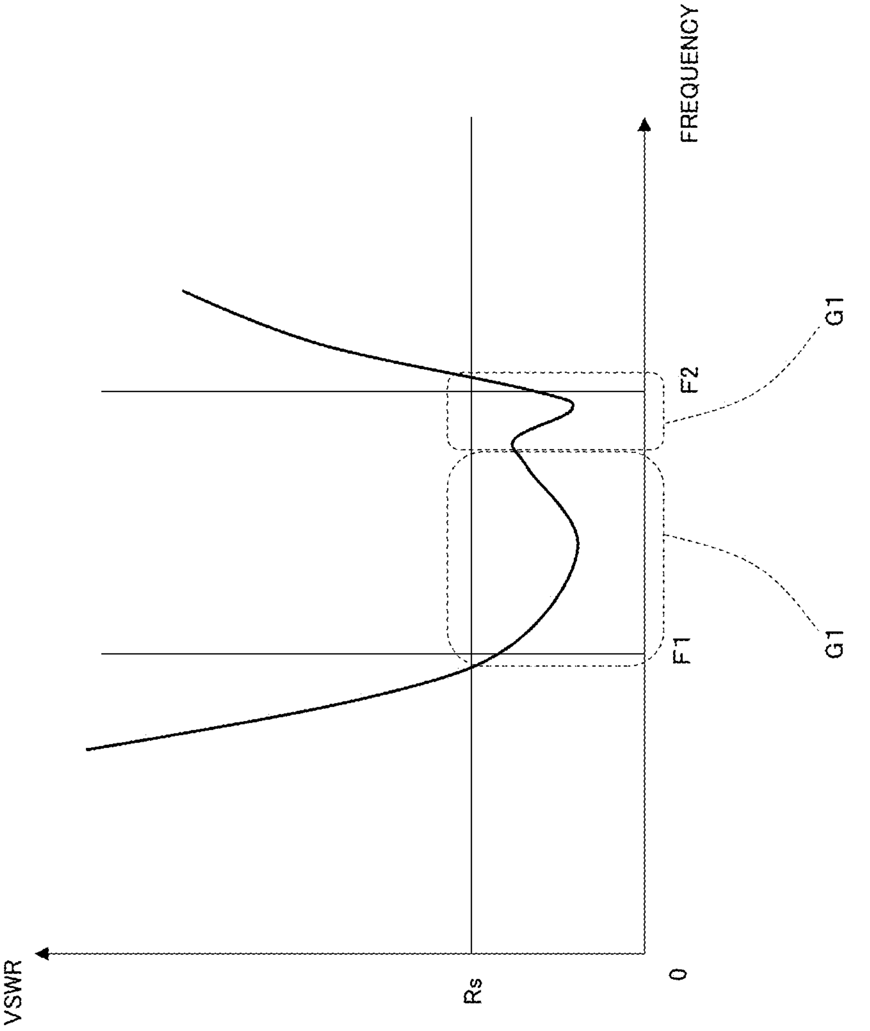
FIG. 4 is a graph showing a change in the voltage standing wave ratio (VSWR) with respect to the frequency of the vehicle-mounted antenna of the embodiment.
Figure 5A:
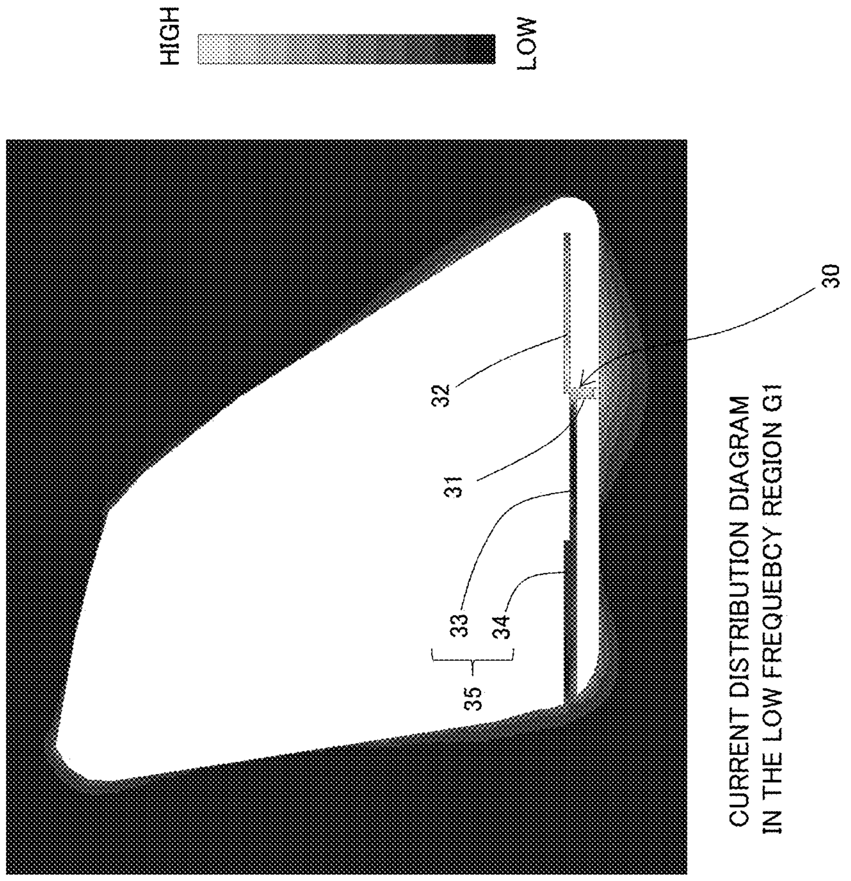
FIG. 5A is a current distribution diagram in the low frequency region G1 shown in FIG. 4.
Figure 5B:
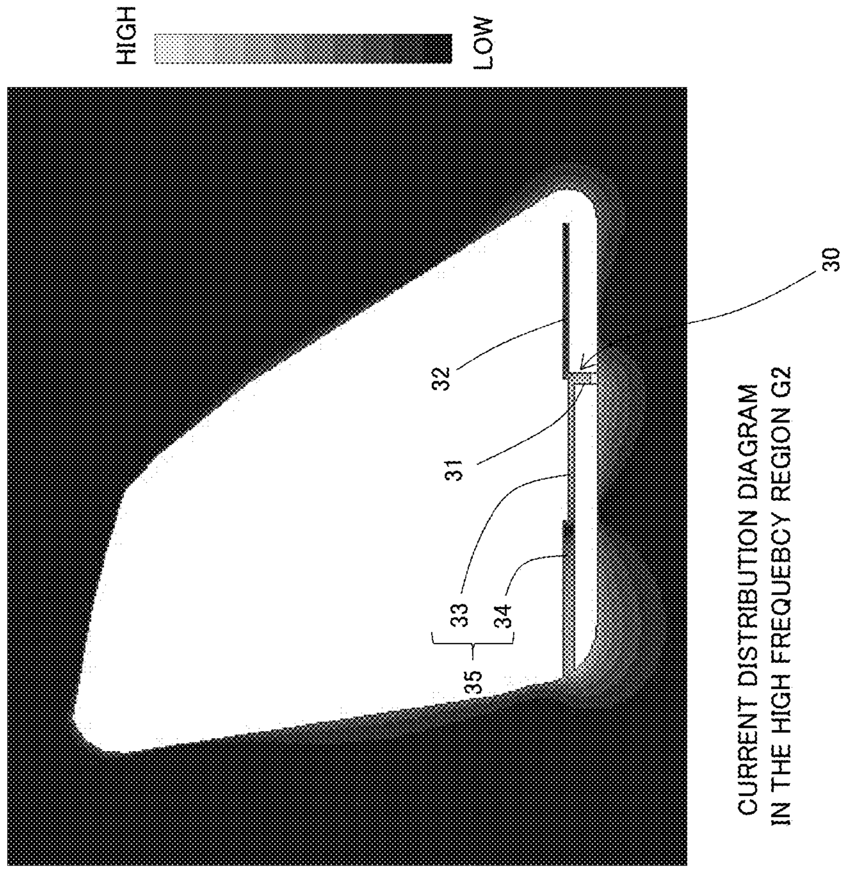
FIG. 5B is a current distribution diagram in the high frequency region G2 shown in FIG. 4.

Next, the characteristics of the vehicle-mounted antenna 30 will be described with reference to FIGS. 4,5A, and 5B. As shown in FIG. 4, in the low frequency region G1, the first radiation element 32 receives radio waves, and in the high frequency region G2, the second radiation element 35 receives radio waves. FIGS. 5A, 5B show current distributions in the low frequency region G1 and the high frequency region G2 in this case. In FIGS. 5A, 5B, the larger the current is, the white color becomes, and the smaller the current is, the black color becomes. As shown in FIG. 5A, in the low frequency region G1, the color of the first radiation element 32 is white, and the current of the first radiation element 32 is large. In addition, in FIG. 5B, the color of the proximal portion 33 of the second radiation element 35 is white, and the current of the proximal portion 33 is increased. Since the second radiation element 35 adjusts the input impedance of the vehicle-mounted antenna 30, impedance matching can be achieved in a wide band. Further, by fixing the first tip portion 32*a* and the intermediate portion 36 to the lower side 16 via the first and second insulating members 37 and 38, mutual coupling occurs between the body 10 and the first radiation element 32, and between the body 10 and the second radiation element 35. Thus, even if the vehicle-mounted antenna 30 is configured such that the heights H1, H21, and H22 are lower than the height H3, the voltage standing wave ratio (VSWR) between the lower limit frequency F1 and the upper limit frequency F2 of the DTV radio wave can be reduced to less than a predetermined threshold Rs, and the gain of the vehicle-mounted antenna 30 can be increased, as shown in FIG. 4.

As described above, in the vehicle-mounted antenna 30, the first radiation element 32 and the second radiation element 35 receive the low frequency region G1 and the high frequency region G2, respectively, and the impedance matching is performed in a wide band by the second radiation element 35, and further, the voltage standing wave ratio (VSWR) in the frequency range of the DTV is reduced by mutual coupling generated between the second radiation element 35 and the body 10. Accordingly, the vehicle-mounted antenna 30 can receive a wide band of radio waves with a high gain with a compact configuration in which the heights H1, H21, and H22 are lower than the height H3, and can be disposed so as not to be seen by the passenger of the vehicle 100.

Figure 6:
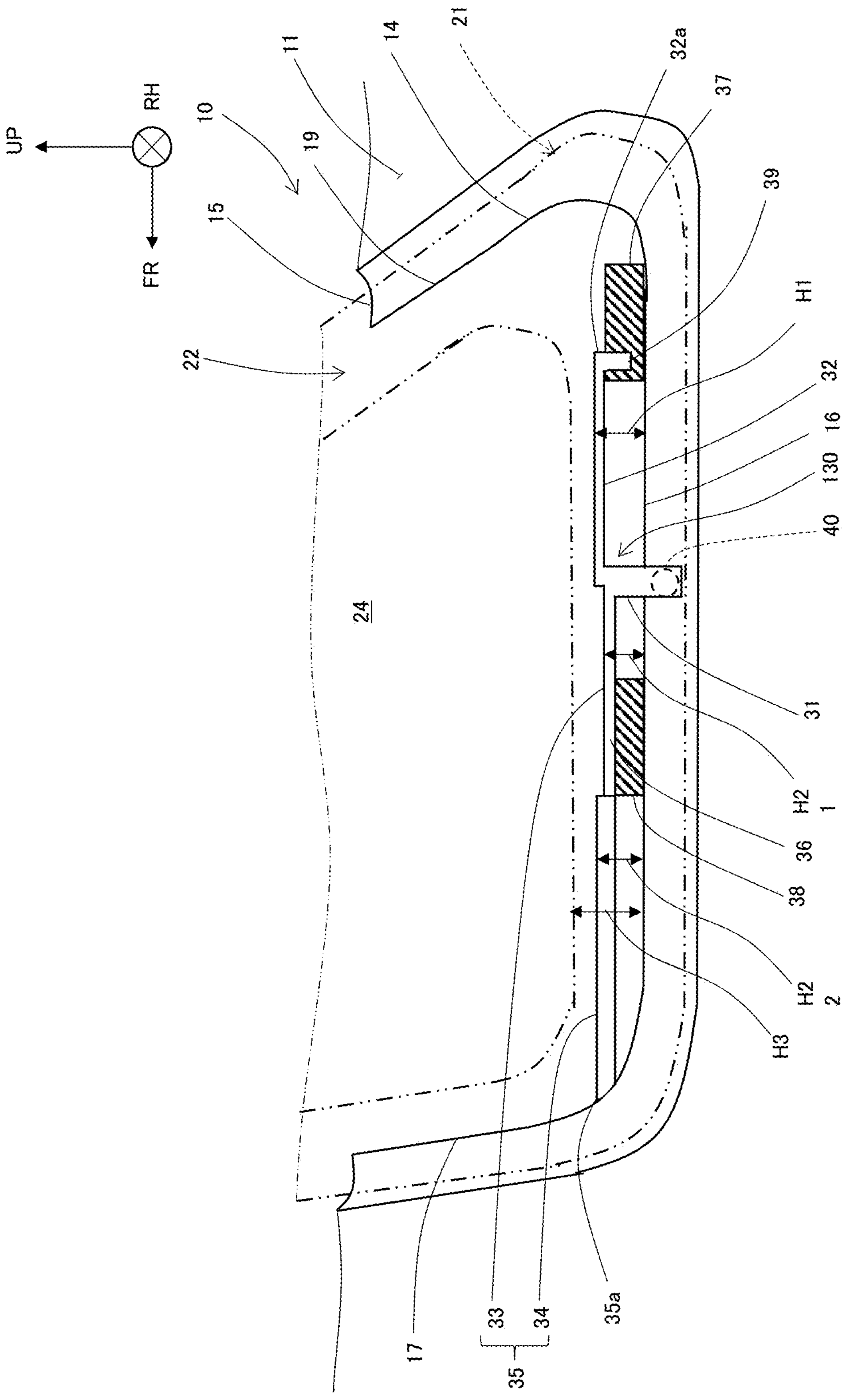
FIG. 6 is an elevation view showing a vehicle-mounted antenna according to another embodiment.

Next, another embodiment of the vehicle-mounted antenna 130 will be described with reference to FIG. 6. The same components as those of the vehicle-mounted antenna 30 described above with reference to FIGS. 1 to 4 are denoted by the same reference numerals, and description thereof is omitted.

The vehicle-mounted antenna 130 comprises an end segment 39 extending downwardly from the first tip portion 32*a* of the first radiation element 32. The end segment 39 and the first tip portion 32*a* are fixed to the lower side 16 via the first insulating member 37. Other configurations are the same as those of the vehicle-mounted antenna 30 described above.

By providing the end segment 39, the input impedance of the vehicle-mounted antenna 30 in the low frequency region G1 received by the first radiation element 32 is adjusted, and impedance matching in the low frequency region G1 can be achieved. Therefore, the gain in the low frequency region G1 can be increased. Similarly to the vehicle-mounted antenna 30, the vehicle-mounted antenna 130 can receive a compact and wide band radio wave having a low height.

In the above description, the first radiation element 32 extends from the power supply pin 31 to the rear of the vehicle, and the second radiation element 35 extends from the power supply pin 31 to the front of the vehicle. For example, the first radiation element 32 may extend from the power supply pin 31 toward the front of the vehicle, the second radiation element 35 may extend from the power supply pin 31 toward the rear of the vehicle, and the second tip portion 35*a* may be connected to the rear vertical side 19.

Alternatively, the power supply pin 31 may be provided upright downward from the upper side 18 of the window opening 14, the first radiation element 32 may be fixed to the upper side 18 via the first insulating member 37, and the second radiation element 35 may be fixed to the upper side 18 via the second insulating member 38.

Also in this case, when the rear quarter glass 21 is attached to the step portion 15, the upper portion of the masking region 22 overlaps the vehicle-mounted antenna 30 in the thickness direction of the rear quarter glass 21, so that the vehicle-mounted antenna 30 does not touch the eyes of the passenger of the vehicle 100, thereby improving the aesthetic appearance of the vehicle 100.

The vehicle-mounted antenna 30 may be attached to a window opening other than the window opening 14 of the rear quarter panel 11. For example, it may be attached to a window opening for the rear window of the rear panel. In this case, the first radiation element 32 and the second radiation element 35 extend in the first direction in the vehicle width direction and in the second direction opposite to the first direction. For example, the first radiation element 32 may extend in the right direction of the vehicle, and the second radiation element 35 may extend in the left direction of the vehicle.

Further, the input impedance of the vehicle-mounted antenna 30 may be adjusted by adjusting the thickness of the distal portion 34 according to the structure of the body 10, thereby performing impedance matching in a wide band. Further, the thickness of the distal portion 34 may be the same as the thickness of the proximal portion 33.

In the above description, the first radiation element 32 and the second radiation element 35 are described as extending in a horizontal plane, but the horizontal direction herein does not need to be strictly horizontal, and may be horizontal to such an extent as to be able to receive the radio wave of the DTV of the horizontal polarization. Accordingly, the first radiation element 32 and the second radiation element 35 may extend in a plane with some inclination with respect to a strict horizontal plane.

Further, in the above description, the vehicle-mounted antenna 30 and 130 receive DTV radio waves, but the present disclosure is not limited thereto, and the present disclosure can also be applied to antennas for transmitting and receiving radio waves such as WiFi and V2X.

The invention claimed is:

1. A vehicle-mounted antenna attached to a body of a vehicle, the vehicle-mounted antenna comprising:
- a power supply pin disposed in an upright position on the body;
- a first radiation element extending from the power supply pin along a first direction in a horizontal plane; and
- a second radiation element extending from the power supply pin along a second direction opposite to the first direction in the horizontal plane, wherein
- a first tip portion of the first radiation element is fixed to the body via a first insulating member,
- the second radiation element is longer than the first radiation element and comprises a second tip portion and an intermediate portion,
- the second tip portion is electrically connected to the body,
- the intermediate portion is located between the power supply pin and the second tip portion, and is fixed to the body via a second insulating member,
- the second radiation element extends in a straight line shape along the second direction, and comprises:
  - a proximal portion connected to the power supply pin, and
  - a distal portion distant from the power supply pin, the distal portion has a thickness greater than a thickness of the proximal portion,
- the intermediate portion is located on a distal portion side of the proximal portion, and
- the second radiation element is configured to adjust an input impedance of the vehicle-mounted antenna.

2. The vehicle-mounted antenna according to claim 1, wherein
- the first radiation element comprises an end segment extending downwardly from the first tip portion, and
- the end segment is fixed to the body together with the first tip portion via the first insulating member.

3. The vehicle-mounted antenna according to claim 1, wherein
- the distal portion extends from the intermediate portion further away from the power supply pin, and comprises the second tip portion.

4. The vehicle-mounted antenna according to claim 3, wherein
- the first radiation element is a metal elongated strip-shaped plate member extending from an upper portion of the power supply pin toward a rear of the vehicle in the horizontal plane, and is configured to receive a horizontally polarized digital television (DTV) radio wave, and
- the second radiation element is a metal elongated strip-shaped plate member extending from the upper portion of the power supply pin toward a front of the vehicle in the horizontal plane, and is configured to receive an electric wave of the DTV of a horizontal polarization.

5. The vehicle-mounted antenna according to claim 4, wherein
- the first radiation element comprises an end segment extending downwardly from the first tip portion, and
- the end segment is fixed to the body together with the first tip portion via the first insulating member.

6. The vehicle-mounted antenna according to claim 5, wherein
- the first insulating member is of resin.

7. The vehicle-mounted antenna according to claim 6, wherein
- the input impedance of the vehicle-mounted antenna is configured to be adjusted by
  - the thickness of the distal portion, and
  - a height from a lower side, from which the power supply pin extends in a vehicle upward direction, to an upper end surface of the distal portion.

8. An antenna-mounted vehicle, comprising:
- a body and an antenna, wherein
- the body comprises a window opening and a window glass arranged in the window opening;
- the window glass is provided with an opaque masking region at a peripheral portion of the window glass; and
- the antenna is a vehicle-mounted antenna attached to the body so as to overlap with the masking region in a thickness direction of the window glass;
- the vehicle-mounted antenna comprising:
  - a power supply pin disposed in an upright position on the body;
  - a first radiation element extending from the power supply pin along a first direction in a horizontal plane; and
  - a second radiation element extending from the power supply pin along a second direction opposite to the first direction in the horizontal plane, wherein
- a first tip portion of the first radiation element is fixed to the body via a first insulating member,
- the second radiation element is longer than the first radiation element and comprises a second tip portion and an intermediate portion,
- the second tip portion is electrically connected to the body,
- the intermediate portion is located between the power supply pin and the second tip portion, and is fixed to the body via a second insulating member,
- the second radiation element extends in a straight line shape along the second direction, and comprises:
  - a proximal portion connected to the power supply pin, and
  - a distal portion distant from the power supply pin, the distal portion being greater in thickness than the proximal portion,
- the intermediate portion is located on a distal portion side of the proximal portion, and
- the second radiation element is configured to adjust an input impedance of the vehicle-mounted antenna.

9. The antenna-mounted vehicle according to claim 8, wherein:
- the power supply pin is disposed in the upright position on an upper edge or a lower edge of the window opening,
- the first tip portion of the first radiation element is fixed to the upper edge or the lower edge of the window opening via the first insulating member,
- the second tip portion is connected to a vertical edge of the window opening,
- the intermediate portion is fixed to the upper edge or the lower edge of the window opening via the second insulating member, and the power supply pin, the first radiation element, and the second radiation element are disposed so as to overlap the masking region in a thickness direction of the window glass.

* * * * *